United States Patent
Chadha et al.

(10) Patent No.: US 9,509,773 B2
(45) Date of Patent: Nov. 29, 2016

(54) ARRAY-BASED COMPUTATIONS ON A STORAGE DEVICE

(71) Applicant: Futurewei Technologies, Inc., Plano, TX (US)

(72) Inventors: Vineet Chadha, San Jose, CA (US); Gopinath Palani, Sunnyvale, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 258 days.

(21) Appl. No.: 14/482,352

(22) Filed: Sep. 10, 2014

(65) Prior Publication Data
US 2016/0072885 A1 Mar. 10, 2016

(51) Int. Cl.
G06F 17/30 (2006.01)
H04L 29/08 (2006.01)
G06F 3/06 (2006.01)

(52) U.S. Cl.
CPC ......... *H04L 67/1097* (2013.01); *G06F 3/0665* (2013.01); *G06F 3/0689* (2013.01); *G06F 17/302* (2013.01); *G06F 17/30067* (2013.01); *G06F 17/30091* (2013.01)

(58) Field of Classification Search
CPC .......... G06F 17/30067; G06F 17/30091; G06F 3/0665; G06F 3/0689; G06F 2209/509
See application file for complete search history.

(56) References Cited

U.S. PATENT DOCUMENTS

| | | | |
|---|---|---|---|
| 7,177,833 B1 | 2/2007 | Yagawa | |
| 7,313,614 B2* | 12/2007 | Considine | G06F 11/2074 709/217 |
| 7,546,324 B2* | 6/2009 | Prahlad | G06F 17/30197 |
| 8,386,644 B1* | 2/2013 | Mercer | H04L 47/621 370/394 |
| 8,654,784 B2* | 2/2014 | Starks | H04L 47/365 370/464 |
| 8,725,986 B1* | 5/2014 | Goel | G06F 12/0223 711/114 |
| 8,805,901 B1* | 8/2014 | Jacobs | G06F 17/30168 707/625 |
| 8,935,318 B1* | 1/2015 | Konerding | G06F 9/5072 709/203 |
| 8,972,345 B1* | 3/2015 | Aguilera | G06F 17/30194 707/615 |

(Continued)

FOREIGN PATENT DOCUMENTS

CN 103064635 A 4/2013

OTHER PUBLICATIONS

Dotsenko, Yuri, Cristian Coarfa, and John Mellor-Crummey. "A multi-platform co-array fortran compiler." Proceedings of the 13th International Conference on Parallel Architectures and Compilation Techniques. IEEE Computer Society, 2004.*

(Continued)

*Primary Examiner* — Jimmy H Tran
(74) *Attorney, Agent, or Firm* — Schwegman Lundberg & Woessner, P.A.

(57) ABSTRACT

An instruction from an application server to perform a computation is received at a network-attached storage (NAS) device. The computation uses arrays of data that are stored by the NAS device as inputs. The instruction includes remote procedure calls that identify operations that are included in the computation, including a first remote procedure call that will cause the NAS device to perform a read operation on a first file containing an array of data to be used as an input for the computation, and a second remote procedure call that will cause the NAS device to perform an array operation using the array of data. The operations are executed on the NAS device to produce a result that is stored in a second file in a location in a file system managed by the NAS device and accessible to the application server.

20 Claims, 5 Drawing Sheets

(56) References Cited

U.S. PATENT DOCUMENTS

| | | | |
|---|---|---|---|
| 9,152,648 B2* | 10/2015 | Regni | G06F 17/30221 |
| 2002/0083120 A1 | 6/2002 | Soltis | |
| 2002/0194428 A1* | 12/2002 | Green | H04L 67/1097 |
| | | | 711/114 |
| 2003/0115296 A1* | 6/2003 | Jantz | H04L 29/06 |
| | | | 709/220 |
| 2006/0168398 A1* | 7/2006 | Cadaret | G06F 3/0625 |
| | | | 711/114 |
| 2008/0148025 A1* | 6/2008 | Gopal | G06F 11/1076 |
| | | | 712/225 |
| 2008/0243982 A1* | 10/2008 | Arviv | G06F 17/16 |
| | | | 708/314 |
| 2009/0150404 A1 | 6/2009 | Lin | |
| 2009/0182836 A1 | 7/2009 | Aviles et al. | |
| 2009/0204784 A1* | 8/2009 | Favergeon-Borgialli | G06F 12/0207 |
| | | | 711/203 |
| 2009/0300301 A1* | 12/2009 | Vaghani | G06F 3/061 |
| | | | 711/162 |
| 2010/0186014 A1* | 7/2010 | Vaghani | G06F 3/06 |
| | | | 718/101 |
| 2010/0306269 A1* | 12/2010 | Osmond | G06F 17/30067 |
| | | | 707/792 |
| 2011/0265077 A1* | 10/2011 | Collison | G06F 8/71 |
| | | | 717/172 |
| 2012/0084459 A1* | 4/2012 | Wu | H04L 45/7453 |
| | | | 709/238 |
| 2015/0032691 A1* | 1/2015 | Hall | H04L 29/06 |
| | | | 707/610 |
| 2015/0106420 A1* | 4/2015 | Warfield | H04L 41/5077 |
| | | | 709/201 |
| 2015/0121371 A1* | 4/2015 | Gummaraju | G06F 17/30194 |
| | | | 718/1 |
| 2015/0269185 A1* | 9/2015 | Fang | G06F 17/30 |
| | | | 707/703 |
| 2015/0370492 A1* | 12/2015 | Satnur | G06F 3/0614 |
| | | | 711/114 |

OTHER PUBLICATIONS

Dean, Jeffrey, and Sanjay Ghemawat. "MapReduce: simplified data processing on large clusters." Communications of the ACM 51.1 (2008): 107-113.*

Ranger, Colby, et al. "Evaluating mapreduce for multi-core and multiprocessor systems." 2007 IEEE 13th International Symposium on High Performance Computer Architecture. Ieee, 2007.*

Zhu, Yifeng, et al. "Hba: Distributed metadata management for large cluster-based storage systems." IEEE Transactions on Parallel and Distributed Systems 19.6 (2008): 750-763.*

International Search Report dated Nov. 2, 2015, 10 pages.

* cited by examiner

ARRAY-BASED COMPUTATIONS ON A STORAGE DEVICE

BACKGROUND

"Big data" is a commonly-used term that refers to very large data sets that are a byproduct of rapid advances in data collection and storage. While the data itself has importance, it is also important to be able to identify relevant data within the data sets and to use analytics to create value from the relevant data. The ability of a business to analyze large data sets and understand and apply the results can be key to increasing competitiveness, productivity, and innovation. However, as the amount of data continues to grow, current systems may find it difficult to keep pace.

A distributed or shared storage system (e.g., a network-attached storage (NAS) system or cluster) typically includes a number of NAS devices that provide file-based data storage services to other devices (clients, such as application servers) in the network. An NAS device is, generally speaking, a specialized computer system configured to store and serve files. Accordingly, an NAS device has less capability compared to a general purpose computer system such as an application server. For example, an NAS device may have a simpler operating system and a less powerful processor, and may also be lacking other components such as a keyboard and display.

An application server can retrieve data stored by an NAS system over a network using a data-sharing or file-sharing protocol such as Network File System (NFS) or Common Internet File System (CIFS). After retrieving the data, the application server can analyze it as mentioned above.

The conventional approach—in which an NAS system supplies data to an application server, which then analyzes the data—is problematic for very large data sets (big data). Generally speaking, it can take a relatively long time and can consume a relatively large amount of bandwidth and other resources to deliver big data from NAS devices to application servers. For example, multiple remote procedure calls are defined for the NFS protocol, including read, lookup, readdir, and remove. In the NFS protocol, file or directory objects are addressed through opaque file handles. Any read call is preceded by a lookup to locate the object to be read. The read call is then invoked iteratively; the number of times it is invoked depends on the NFS configuration and the size of the object to be fetched. With the larger data sets associated with big data, the read call will have to be invoked many times to fetch the data for a single object. Thus, operations such as a read call over a distributed storage system can be very expensive in terms of the amount of computational resources and bandwidth that are consumed.

SUMMARY

In overview, in embodiments according to the present invention, data-sharing and file-sharing protocols (such as but not limited to NFS and CIFS) are extended to steer computations toward and onto data storage nodes (e.g., NAS devices) and away from computation nodes (e.g., application servers). To accommodate the relatively sparse resources available on NAS devices, computations are separated into different operations, which are then performed using, for example, relatively lightweight virtual machines (sometimes known as virtualization containers) that are capable of being executed on NAS devices.

In embodiments according to the invention, standard protocols such as NFS and CIFS are modified to support new remote procedure calls that specify data operations (or semantics) along with pointers to the data to be operated on. In an embodiment, an instruction from a client (e.g., an application server) to perform a computation is received at an NAS device. In an embodiment, the instruction is or includes one or more of the new remote procedure calls, to identify where data for the computation can be obtained and also to identify the operations included in the computation. In an embodiment, a single operation is associated with each remote procedure call. In an embodiment, the request also includes a fully qualified name for a file to which the computation results are to be written.

The computation is translated into separate array operations (e.g., add, multiply, inverse, and transpose). In an embodiment, the operations are performed using respective virtual machines executing on the NAS device to get a result. In an embodiment, each virtual machine is configured to perform a single operation. The operations can be pipelined; they can be performed asynchronously, in series or in parallel as allowed or required.

The computation results are stored in a file that is accessible to the client. In an embodiment, the computation results are sent to the client. In another embodiment, information indicating a location of the file containing the results is sent to the client (the location may be the fully qualified file name referred to above, if one is included in the client request).

In an embodiment, information indicating a status of the computation is sent to the client.

Embodiments according to the present invention reduce latency and increase available bandwidth in a network because it is not necessary to transfer large data sets (big data) across a network from storage nodes to application servers. The storage nodes perform calculations on data sets, particularly the larger data sets associated with big data; accordingly, application servers do not need to iteratively invoke read calls to fetch the data. Reducing latency can also improve the accuracy and/or relevancy of computation results, because the computation can be based on data sets that are more current. Also, by offloading computations to storage nodes, application servers are available to perform other tasks. Conversely, resources on storage nodes are more effectively utilized.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 58B is a flowchart of an example of a computer-implemented method for offloading computations from an application server to an NAS device in an embodiment according to the present invention.

DETAILED DESCRIPTION

Figure 1:
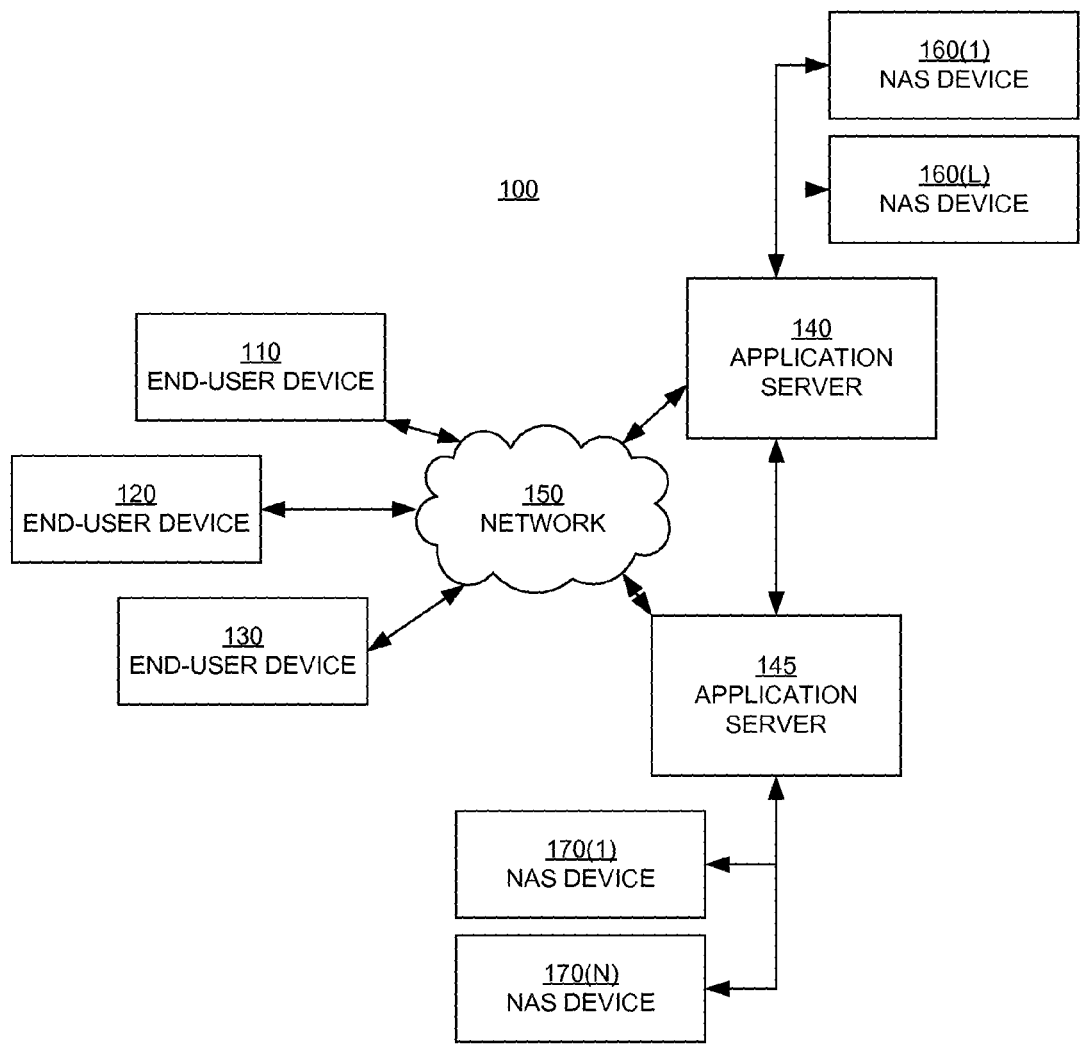
FIG. 1 is a block diagram of an example of a storage system capable of implementing embodiments according to the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "translating," "performing," "executing," "storing," "sending", "transmitting," "indicating," "identifying." "generating," "separating," "accessing," "obtaining," "adding," "multiplying," "inverting," "transposing," "reading," or the like, refer to actions and processes (e.g., flowcharts 500 and 550 of FIGS. 5A and 5B, respectively) of a computer system or similar electronic computing device or processor (e.g., system 610 of FIG. 6A; system 650 of FIG. 6B). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a network architecture 100 in which end-user devices 110, 120, and 130 and application servers 140 and 145 may be coupled to a network 150. The end-user devices 110, 120, and 130 and application servers 140 and 145 generally represent any type or form of computing device or system, such as the computing system 610 of FIG. 6A.

The application servers 140 and 145 of FIG. 1 also generally represent computing devices or systems configured to provide various services and/or run certain software applications. The network 150 generally represents any telecommunication or computer network including, for example, an intranet, a wide area network (WAN), a local area network (LAN), a personal area network (PAN), or the Internet.

As illustrated in FIG. 1, one or more network-attached storage (NAS) devices 160(1)-(L) may be directly attached to the application server 140. Similarly, one or more NAS devices 170(1)-(N) may be directly attached to the application server 145. The NAS devices 160(1)-(L) and the NAS devices 170(1)-(N) generally represent any type or form of storage device or medium capable of storing data and/or other computer-readable instructions, such as the computing device 660 of FIG. 6B.

The NAS devices 160(1)-(L) and the NAS devices 170 (1)-(N) are configured to communicate with the application servers 140 and 145 using various protocols, such as but not limited to Network File System (NFS) or Common Internet File System (CIFS). The NAS devices 160(1)-(L) and the NAS devices 170(1)-(N) may be arranged into logical, redundant storage containers or RAID (redundant array of independent disks) arrays.

The application servers 140 and 145 may be referred to as clients of the NAS devices 160(1)-(L) and the NAS devices 170(1)-(N). The application servers 140 and 145 may also be connected to a storage area network (SAN) fabric (not shown), which in turn may be coupled to other storage devices (not shown).

Figure 2:
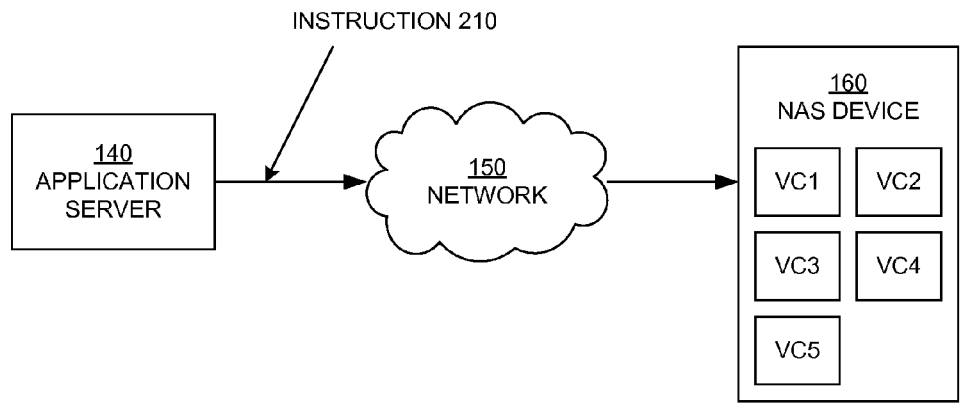
FIG. 2 is a block diagram showing an application server and an NAS device in an embodiment according to the invention.

FIG. 2 is a block diagram showing the application server 140 and the NAS device 160 in an embodiment according to the Invention. In embodiments according to the invention, the NAS device 160 hosts a number of light-weight virtual machines (VMs), known as process or process-level VMs or virtualization containers (VCs). In the example of FIG. 2, there are five VCs (VCs 1-5: VC1, VC2, VC3, VC4, and VC5); however, the invention is not so limited.

Generally, process VMs or VCs can be used to allow a group of processes to execute securely or to provide platform independence to user applications. The VCs 1-5 provide a specialized stack at the operating system level for application execution on the NAS device 160. One such approach of providing a specialized stack at the operating system level utilizes an exokernel, where the kernel is limited to extending resources to sub-operating systems called library operating systems (libOSs).

VCs 1-5 provide isolation of a single operation or task into separate containers—an operation or task per VC. Execution inside the NAS device 160 can be applied with a template manifest based on parameters included in an instruction or request 210 from the application server 140 to the NAS device. The instruction 210 includes one or more remote procedure calls issued by the client's (application server 140) application programming interface (API). Thus, the use of VCs accommodates the relatively sparse resources available on NAS devices. Also, the VCs can be specialized according to the task or operation they will perform. Furthermore, there can be redundant VCs (more than one VC that can perform a particular task or operation); this means that if one VC is busy responding to one instruction or request, then another VC is available to perform the same operation in response to another instruction or request.

In embodiments according to the invention, data-sharing and file-sharing protocols, including but not limited to NFS and CIFS, are extended to steer computations toward and onto the NAS device 160 and away from the application server 140. More specifically, data-sharing and file-sharing protocols are modified to support new remote procedure calls. The new remote procedure calls specify data operations (or semantics) along with pointers to the data to be operated on. Essentially, the operation, logic, and semantics behind the fetching of data from an NAS device is embedded into protocols such as NFS and CIFS, allowing data operations to be performed at the NAS device, which can store the results in a manner that is accessible to the application server, thereby saving the cost of moving large amounts of data from the NAS device to the application server.

In an embodiment, three new remote procedure calls are added to the client's API. In general, these remote procedure calls can be used to identify where to obtain data for a computation and to also identify the operations included in the computation. In an embodiment, the instruction also includes a fully qualified name for the file to which the computation results are to be written.

Specifically, the first of the new remote procedure calls is referred to herein as array_compute ("expr1"), where "expr1" identifies an operation to be performed and the data to be used for the operation. The operation can include, but is not limited to, addition (e.g., add two arrays), multiplication (e.g., multiply two arrays, inverse (e.g., invert an array), or transpose (e.g., transpose an array). The output of this remote procedure call is the result of the operation performed. In an embodiment, multiple arrays or multiple data files containing array data are read, and the output is an array. An example is described below in conjunction with FIG. 3.

The second of the new remote procedure calls is referred to herein as array_from ("filename1"), where "filename1" refers to a fully qualified file name that contains the data for an operation. In an embodiment, an array is read from a data file, and the output is an array.

The third of the new remote procedure calls is referred to herein as array_compute_save ("expr2", "filename2"), where "expr2" identifies an operation to be performed and the data to be used for the operation, and "filename2" identifies a fully qualified file name where the computation results will be written to/stored. In an embodiment, multiple arrays or multiple data files containing array data are read. In an embodiment, the array_compute_save procedure call outputs status information, indicating whether the computation is completed and/or whether or not it was successful, for example.

In operation, an instruction 210 from a client (application server 140) to perform a computation is received at the NAS device 160. In an embodiment, the instruction is or includes one or more of the new remote procedure calls. In an embodiment, the instruction also includes a fully qualified name for the file to which the computation results are to be written.

The computation is then translated into separate operations (e.g., add, multiply, inverse, and transpose). The operations are performed using respective virtual machines (VCs 1-5) executing on the NAS device 160 to get a result. In an embodiment, each virtual machine is configured to perform a single operation. The operations can be pipelined; they can be performed asynchronously, in series or in parallel as required.

The computation results are stored in a file that is accessible to the client (application server 140) and also to end-user devices (e.g. the end-user devices of FIG. 1). In an embodiment, the computation results are sent to the application server 140, which in turn can send the results to an end-user device. In another embodiment, information indicating a fully qualified file name containing the results is sent to the application server 140; an end-user device can use the fully qualified file name to access the results.

Thus, embodiments according to the invention introduce a mechanism to offload computations (e.g., array-based computations) in big data applications to a storage node (an NAS device). User applications such as database queries and big data computations can be mapped to algebraic or matrix computations that are performed on the storage node. Consider an example of a recommendation system in which data is used to tabulate consumers' ratings about multiple products. An M×N array or matrix (where M is the number of consumers and N is the number of products) can be stored and used for analyses such as per product rating, etc. As the array grows in size over time, the computation becomes more and more complex. In a large scale data processing model such as map-reduce, the computation can be reduced (by the application server) to matrix operations (array operations) on the set of arrays. Mapping, shuffling, and reducing phases can be reduced to array operations. The array operations can then be specified using the new remote procedure calls described herein. The array operations can be performed by leveraging the framework and configuration of the VCs on the storage node (the NAS device) to manipulate data to the granularity of the parameters in the instruction from the application server to the NAS device.

Another example of an array-based computation is "R" statistical language and tool chain for data manipulation. Typically, these statistical languages allow array-based computation operation at language-level. This is feasible through compiler-level support to manipulate the arrays. In embodiments according to the invention, compiler-level services are provided using light-weight user-level VMs (VCs) at the storage node (the NAS device).

Figure 3:
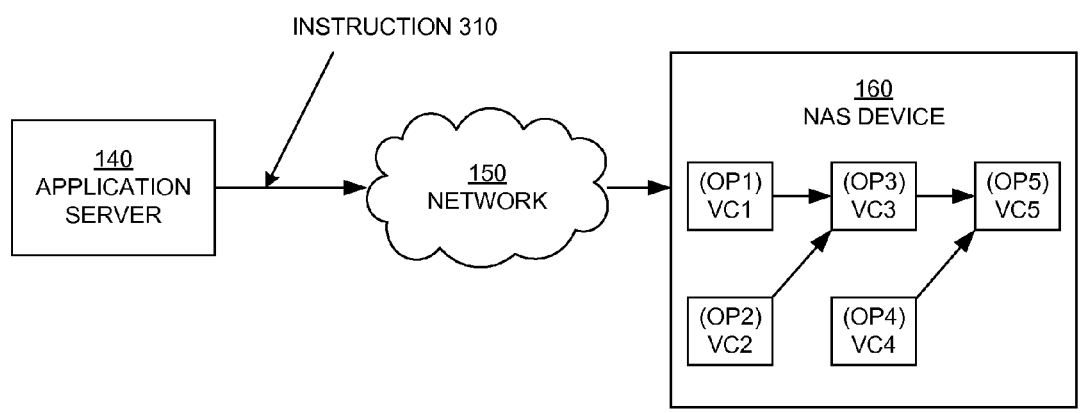
FIG. 3 illustrates an example of an array-based computation performed using virtualization containers in an NAS device in an embodiment according to the invention.

FIG. 3 illustrates an example of an array-based computation performed using virtualization containers (VCs 1-5 of FIG. 2) embedded in an NAS device 160 in an embodiment according to the invention. In the example of FIG. 3, the client (application server 140) sends an instruction or request 310 that includes the following sequence of remote procedure calls:

array_compute("(array_from("FileA")+array_from("FileB"))×array_from("FileC"))").

The instruction 310 thereby identifies the following operations and the locations for the data to be read and operated on:

Op1=array_from("FileA"): read array from FileA;
Op2=array_from("FileB"): read array from FileB;
Op3=+: perform A plus B operation (add the arrays from FileA and File B;
Op4=array_from("FileC"): read array from FileC; and
Op5=×: perform Op3 times FileC (multiply the results of Op3 and the File C array).

Generally speaking, the operations are performed in the sequence implicit in the instruction 310. The operations can be pipelined: they can be performed asynchronously, in series or in parallel as required or allowed. For example, the operations Op1 and Op2 can be performed in parallel, and the operation Op4 can be performed in parallel with the operations Op1 and/or Op2 or in parallel with the operation Op3.

The operation Op1 is performed by VC1, the operation Op2 is performed by VC2, the operation Op3 is performed by VC3, the operation Op4 is performed by VC4, and the operation Op5 is performed by VC5. That is, each of the VCs 1-5 performs a single task or operation. Significantly, the NAS device 160 performs the computation using data (e.g., FileA, FileB, and FileC) that resides on the NAS device, so that the data does not have to be transferred across the network 150 in order to perform the operations. That is, the NAS device 160 can both read the data from its storage devices (see FIG. 6B) and operate on that data.

Figure 4:
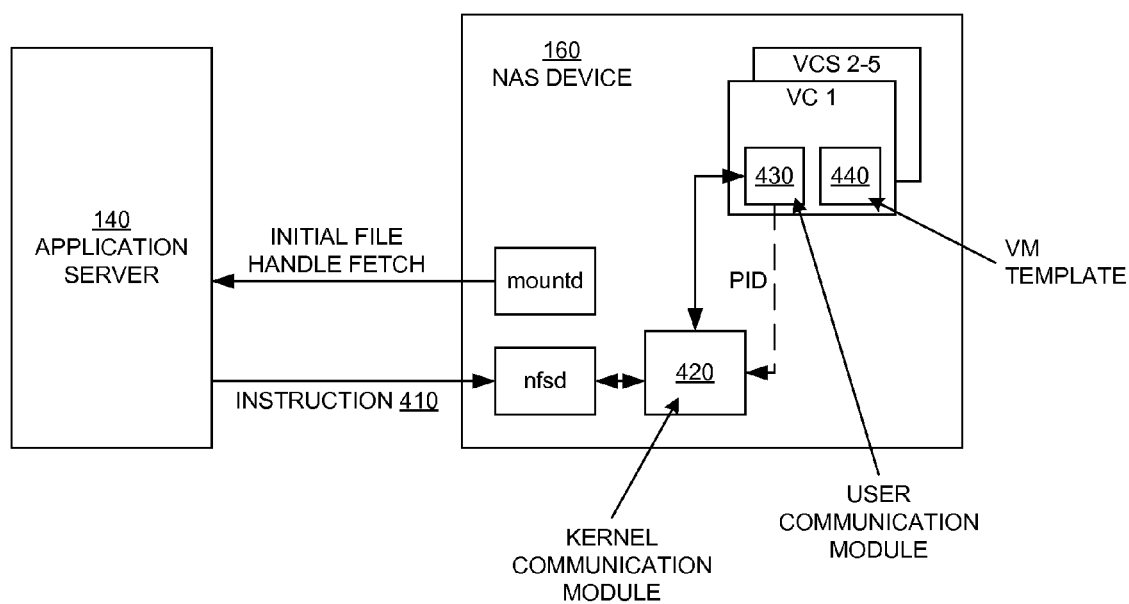
FIG. 4 illustrates an example of an array-based computation in an NFS implementation in an embodiment according to the present invention.

FIG. 4 illustrates an example of an array-based computation in an NFS implementation in an embodiment according to the present invention. In the context of the NFS protocol, files are addressed through a file handle. The application server 140 and the NAS device 160 can communicate to each other via the network 150 (FIG. 1). The mounted daemon on the NAS device 160 responds to an initial file handle request from the application server 140 and mounts an appropriate file system. The instruction 410 from the application server 140 to the NAS device 160 contains one or more of the new remote procedure calls described above. The nfsd daemon handles the request for file system operations included in the instruction 410.

Continuing with reference to FIG. 4, the kernel communication module 420 is configured to provide Indirection of a remote procedure call to the virtualization container VC1 at the user level. The virtualization container VC1 is configured to run an operation included in the instruction 410 as described in conjunction with FIG. 3. The kernel communication module 420 creates an inter-process communication (IPC) channel between the kernel address space and user address space to forward the procedure call to the virtualization container VC1. The kernel communication module 420 also converts (translates or parses) the operations in the instruction 410 into objects (e.g., C objects).

Continuing with reference to FIG. 4, a user-level application thread is configured to receive the request parameter from the kernel communication module 420 to configure the virtualization container. The user communication module 430 registers a process identifier (PID) to the kernel communication module 420 to establish a communication channel with the kernel.

A VM template 440 in the virtualization container VC1 is configured using configuration files according to one of the operations specified in the remote procedure call in the instruction 410.

Depending on the number of other operations included in the instruction 410, one or more other virtualization containers (e.g., VCs 2-5) may be similarly controlled, configured, and executed. The result of each operation, from each virtualization container that is executed, can be joined as in the example of FIG. 3.

In an embodiment, the final result of the computation is sent to the application server 140, where it can be accessed by end-user devices. Alternatively, the computation results can be written to a file that is stored on the NAS device 160; the fully qualified file name for the file (that is, a path to the file) can be sent to the application server and/or to end-user devices. In either case, it is not necessary to send large amounts of data from the NAS device 160 to the application server 140 and/or to end-user devices.

The example of FIG. 4 utilizes kernel-user indirection. The approach could instead be implemented through user-level indirection.

Figure 5A:
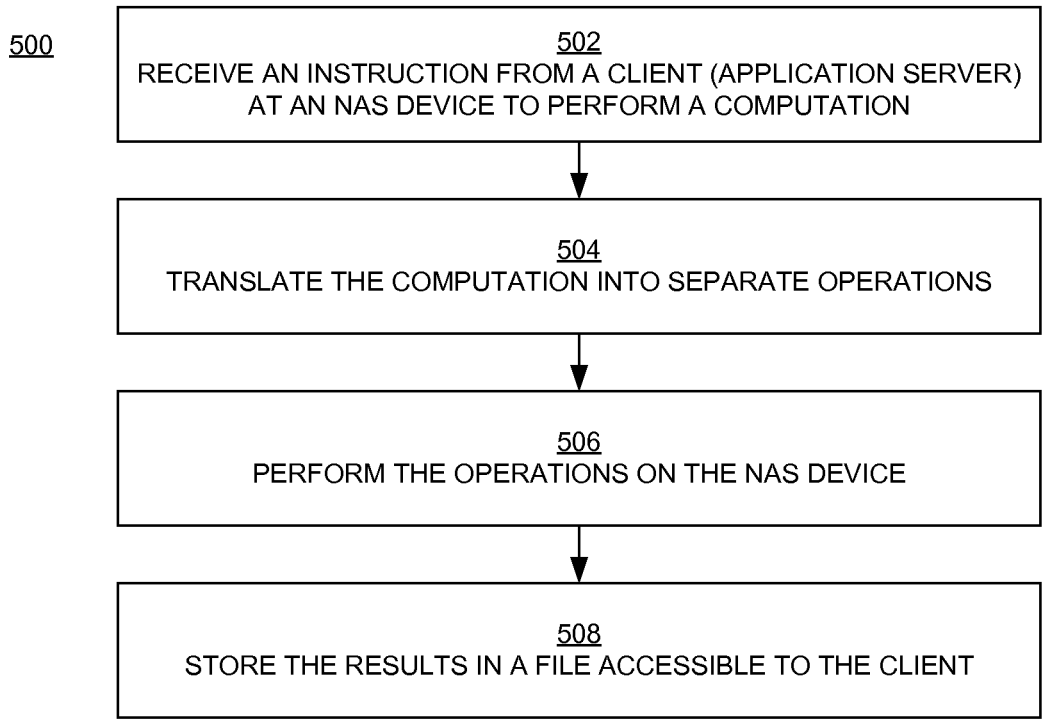
FIG. 5A is a flowchart of an example of a computer-implemented method for performing computations on an NAS device in an embodiment according to the present invention.

FIG. 5A is a flowchart 500 of an example of a computer-implemented method for performing computations on an NAS device (e.g., the NAS device 160) in an embodiment according to the present invention. The flowchart 500 can be implemented as computer-executable instructions residing on some form of non-transitory computer-readable storage medium.

In block 502, an instruction or request from a client (e.g., the application server 140) to perform a computation is received at an NAS device (e.g., the NAS device 160). In an embodiment, the instruction Is or includes one or more of the new remote procedure calls, to identify where to obtain data for the computation and to also identify the operations included in the computation. In an embodiment, the instruction also includes a fully qualified name for the file to which the computation results are to be written.

For example, the remote procedure calls can include a first remote procedure call that causes the NAS device to perform a read operation on a first file containing an array of data to be used as an input for the computation, and a second remote procedure call that causes the NAS device to perform an array operation using the array of data.

In block 504, the computation is then translated into separate array operations (e.g., add, multiply, inverse, and transpose).

In block 506, in an embodiment, the operations are performed using respective virtual machines (virtualization containers) executing on the NAS device to get a result. The operations can be pipelined; they can be performed asynchronously, in series or in parallel as required.

In block 508, the computation results are stored in a file that is accessible to the client (e.g., application server). In an embodiment, the computation results are sent to the client. In another embodiment, information indicating a location of the file containing the results is sent to the client. In an embodiment, information indicating a status of the computation is also sent to the client. For example, the NAS device can inform the client that the computation is completed.

Figure 5B:
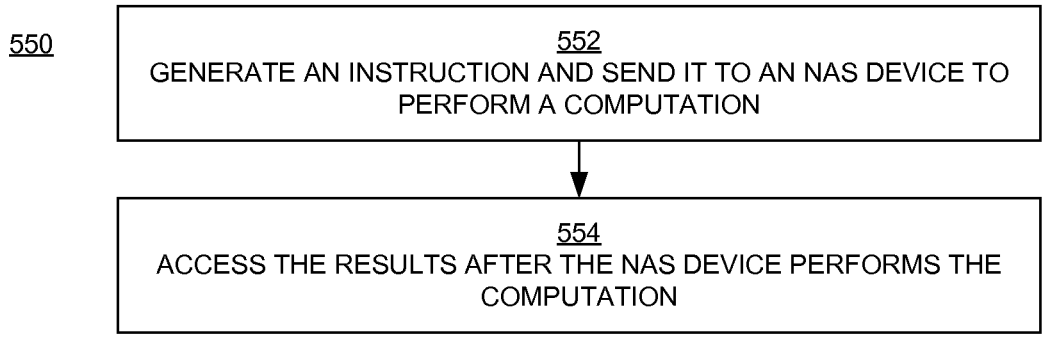

FIG. 5B is a flowchart 550 of an example of a computer-implemented method for performing computations on a client (e.g., the application server 140) in an embodiment according to the present invention. The flowchart 550 can be implemented as computer-executable instructions residing on some form of non-transitory computer-readable storage medium.

The application server identifies a computation to be performed on an array of data stored by an NAS device. As mentioned previously herein, the computation can be reduced to a sequence of operations. For example, the computation may include an array operation to be performed on the array of data, and a read operation to be performed on a first file containing the array of data In block 552, an instruction is generated by the application server and then sent to the NAS device instructing the NAS device to perform a computation that uses arrays of data that are stored by the NAS device as inputs. The instruction includes remote procedure calls that identify operations that are included in the computation. For example, the remote procedure calls can include a first remote procedure call operable for causing the NAS device to perform the read operation on the first file containing the array of data to be used as an input for the computation, and a second remote procedure call operable for causing the NAS device to perform the array operation using the array of data.

In block 554, subsequent to execution of the operations by the NAS device, the application server can access a result of the computation.

Embodiments according to the present invention thus reduce bus and network latency and increase available bandwidth in a network by offloading computations to the storage node; as a result, it is not necessary to transfer large data sets (big data) across a network from storage nodes to application servers. Reducing latency can also improve the accuracy and/or relevancy of computation results, because the computation can be based on data sets that are more current. Also, by offloading computations to storage nodes, application servers are available to perform other tasks. Conversely, resources on storage nodes are more effectively utilized.

Figure 6A:
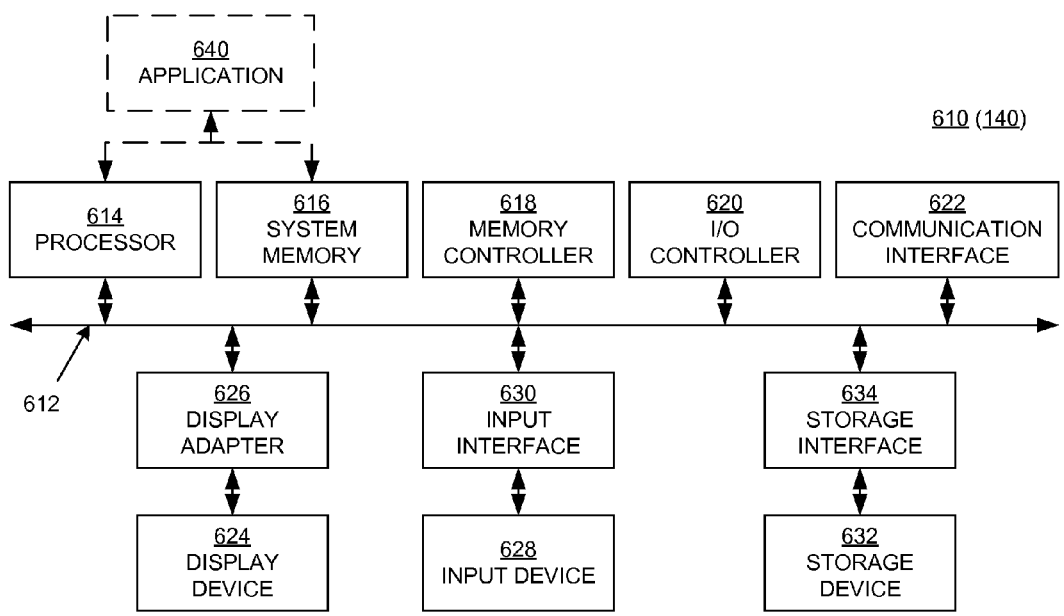
FIGS. 6A and 6B are block diagrams of examples of computing systems capable of implementing embodiments according to the present invention.
Figure 6B:
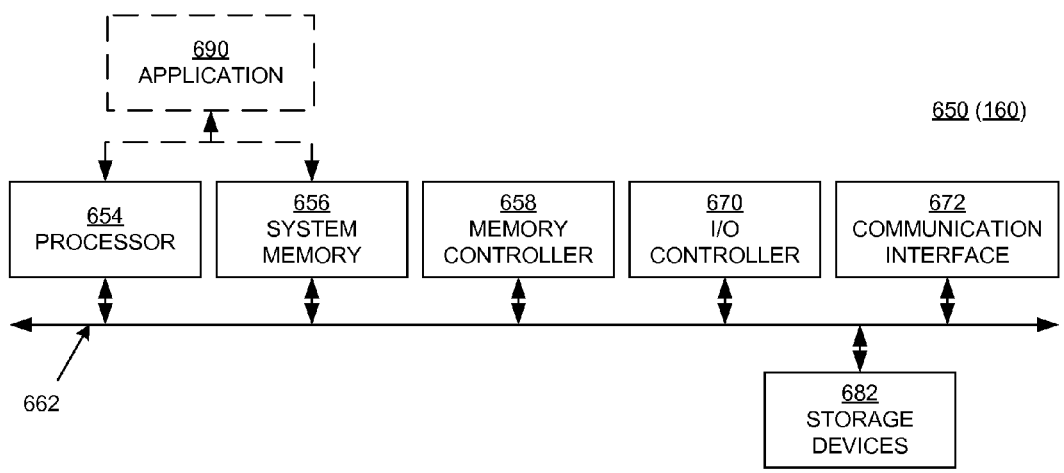

FIG. 6A is a block diagram of an example of a computing system 610 capable of implementing embodiments of the present disclosure. The computing system 610 is an example of an application server. FIG. 6B is a block diagram of another example of a computing system 650 capable of implementing embodiments of the present disclosure. The computing system 650 is an example of an NAS device.

With reference first to FIG. 6A, the computing system 610 broadly represents any single or multi-processor computing device or system capable of executing computer-readable instructions. In its most basic configuration, the computing system 610 may include at least one processor 614 and a system memory 616.

The processor 614 generally represents any type or form of processing unit capable of processing data or interpreting and executing instructions. In certain embodiments, the processor 614 may receive instructions from a software application or module. These instructions may cause the processor 614 to perform the functions of one or more of the example embodiments described and/or illustrated herein.

The system memory 616 generally represents any type or form of volatile or non-volatile storage device or medium capable of storing data and/or other computer-readable instructions. Examples of system memory 616 include, without limitation, RAM, ROM, flash memory, or any other suitable memory device. Although not required, in certain embodiments the computing system 610 may include both a volatile memory unit (such as, for example, system memory 616) and a non-volatile storage device (such as, for example, the storage device 632).

The computing system 610 may also include one or more components or elements in addition to the processor 614 and the system memory 616. For example, in the example of FIG. 6A, the computing system 610 includes a memory controller 618, an input/output (I/O) controller 620, and a communication interface 622, each of which may be interconnected via a communication infrastructure 612. The communication infrastructure 612 generally represents any type or form of infrastructure capable of facilitating communication between one or more components of a computing device.

The memory controller 618 generally represents any type or form of device capable of handling memory or data or controlling communication between one or more components of the computing system 610. For example, the memory controller 618 may control communication between the processor 614, system memory 616, and the I/O controller 620 via the communication infrastructure 612.

The I/O controller 620 generally represents any type or form of module capable of coordinating and/or controlling the input and output functions of a computing device. For example, the I/O controller 620 may control or facilitate transfer of data between one or more elements of the computing system 610, such as the processor 614, system memory 616, the communication interface 622, the display adapter 626, the input interface 630, and the storage interface 634.

The communication interface 622 broadly represents any type or form of communication device or adapter capable of facilitating communication between the example computing system 610 and one or more additional devices. For example, the communication interface 622 may facilitate communication between the computing system 610 and a private or public network including additional computing systems. Examples of the communication interface 622 include, without limitation, a wired network interface (such as a network interface card), a wireless network interface (such as a wireless network interface card), a modem, and any other suitable interface. In one embodiment, the communication interface 622 provides a direct connection to a remote server via a direct link to a network, such as the Internet. The communication interface 622 may also indirectly provide such a connection through, for example, a local area network (such as an Ethernet network), a personal area network, a telephone or cable network, a cellular telephone connection, a satellite data connection, or any other suitable connection.

The communication interface 622 may also represent a host adapter configured to facilitate communication between the computing system 610 and one or more additional network or storage devices via an external bus or communications channel. The communication interface 622 may also allow the computing system 610 to engage in distributed or remote computing. For example, the communication interface 622 may receive instructions from a remote device or send instructions to a remote device for execution.

As illustrated in FIG. 6A, the computing system 610 may also include at least one display device 624 coupled to the communication infrastructure 612 via a display adapter 626. The optional display device 624 generally represents any type or form of device capable of visually displaying information forwarded by the display adapter 626. Similarly, the display adapter 626 generally represents any type or form of device configured to forward graphics, text, and other data from the communication infrastructure 612 (or from a frame buffer, as known in the art) for display on the display device 624.

As illustrated in FIG. 6A, the computing system 610 may also include at least one input device 628 coupled to the communication infrastructure 612 via an input interface 630. The input device 628 generally represents any type or form of input device capable of providing input, either computer-generated or human-generated, to the computing system 610. Examples of the input device 628 include, without limitation, a keyboard, a pointing device, a speech recognition device, or any other input device.

As illustrated in FIG. 6A, the computing system 610 may also include a storage device 632. The storage device 632 generally represents any type or form of storage device or medium capable of storing data and/or other computer-readable instructions. For example, the storage device 632 may be a magnetic disk drive (e.g., a so-called hard drive), a floppy disk drive, a magnetic tape drive, an optical disk drive, a flash drive, or the like. The storage device 632 may be a part of the computing system 610 or may be a separate device accessed through another interface system.

The computing system 610 can execute an application 640 that allows it to perform operations (e.g., the operations of FIG. 5B). A computer program containing the application 640 may be loaded into the computing system 610. For example, all or a portion of the computer program stored on a computer-readable medium may be stored in the memory 616. When executed by the processor 614, the computer program can cause the processor to perform and/or be a means for performing the functions of the example embodiments described and/or illustrated herein. Additionally or alternatively, the example embodiments described and/or illustrated herein may be implemented in firmware and/or hardware.

With reference next to FIG. 6B, the computing system 650 also broadly represents any single or multi-processor computing device or system capable of executing computer-readable instructions. In its most basic configuration, the computing system 650 may include at least one processor 654 and a system memory 656, such as that described above.

The computing system 650 may also include one or more components or elements in addition to the processor 654 and the system memory 656. For example, in the embodiment of FIG. 6B, the computing system 610 includes a memory controller 658, an input/output (I/O) controller 670, and a communication interface 672, each of which may be interconnected via a communication infrastructure 662, such as those described previously herein.

As illustrated in FIG. 6B, the computing system 650 also includes storage devices 682. The storage devices 682 generally represent any type or form of storage device or medium capable of storing data and/or other computer-readable instructions. For example, the storage devices 682 may be magnetic disk drive (e.g., a so-called hard drive), a floppy disk drive, a magnetic tape drive, an optical disk drive, a flash drive, or the like. The storage devices 682 may be part of the computing system 610 or may be separate devices accessed through another interface system. The storage devices 682 may be arranged into logical, redundant storage containers or RAID (redundant array of independent disks) arrays.

The computing system 650 can execute an application 690 that allows it to perform operations (e.g., the operations of FIG. 5A). A computer program containing the application 690 may be loaded into the computing system 650. For example, all or a portion of the computer program stored on a computer-readable medium may be stored in the memory 656. When executed by the processor 654, the computer program can cause the processor to perform and/or be a means for performing the functions of the example embodiments described and/or illustrated herein. Additionally or alternatively, the example embodiments described and/or illustrated herein may be implemented in firmware and/or hardware.

Many other devices or subsystems may be connected to the computing systems 610 and 650. Conversely, all of the components and devices illustrated in FIGS. 6A and 6B need not be present to practice the embodiments described herein. The devices and subsystems referenced above may also be interconnected in different ways from that shown in FIGS. 6A and 6B. The computing systems 610 and 650 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method performed by a network-attached storage (NAS) device comprising a processor and memory, the method executed by the processor and comprising:
receiving, at the NAS device, an instruction from an application server that causes the NAS device to perform a computation that uses arrays of data that are stored by the NAS device as inputs, the instruction comprising a plurality of remote procedure calls that identify operations that are included in the computation, the remote procedure calls comprising a first remote procedure call operable for causing the NAS device to perform a read operation on a first file stored by the NAS device and containing an array of data to be used as an input for the computation, the remote procedure calls further comprising a second remote procedure call operable for causing the NAS device to perform an array operation using the array of data from the first file;
executing the read operation and the array operation on the NAS device to produce a result; and
storing the result in a second file in a location in a file system managed by the NAS device and accessible to the application server.

2. The method of claim 1, wherein the array operation is selected from the group consisting of: add the array of data and another array of data; multiply the array of data by another array of data; invert the array of data; and transpose the array of data.

3. The method of claim 1, wherein each remote procedure call in the plurality of remote procedure calls is associated with a single one of the operations.

4. The method of claim 1, further comprising performing the operations on the NAS device using a plurality of virtual machines that are executed on the NAS device, each virtual machine in the plurality of virtual machines configured to perform a single operation.

5. The method of claim 1, further comprising the NAS device sending the result to the application server.

6. The method of claim 1, further comprising the NAS device sending, to the application server, information comprising a fully qualified name for the second file.

7. The method of claim 1, wherein the remote procedure calls include information comprising a fully qualified name for the second file.

8. The method of claim 1, wherein the remote procedure calls are included in a data-sharing and file-sharing protocol selected from the group consisting of: Network File System; and Common Internet File System.

9. The method of claim 1, wherein the remote procedure calls are selected from the group consisting of a first remote procedure call that identifies data to be read and an operation to be performed; a second remote procedure call that identifies a fully qualified file name for data to be read; and a third remote procedure call that identifies data to be read, an operation to be performed, and a fully qualified file name for a computation result.

10. The method of claim 1, further comprising sending information to the application server indicating a status of the computation.

11. A network-attached storage (NAS) device, comprising:
a processor, and
memory coupled to the processor and having stored therein instructions that, if executed by the NAS, cause the NAS device to perform a method comprising:
receiving, at the NAS device, an Instruction from an application server that causes the NAS device to perform a computation that uses arrays of data that are stored by the NAS device as inputs, the instruction comprising a sequence of remote procedure calls that identify operations that are included in the computation, the operations comprising a read operation on a first file in a file system managed by the NAS device, the first file containing an array of data, the operations further comprising an array operation that uses the array of data from the first file;
in response to the remote procedure calls in the instruction, performing the operations including the read operation and the array operation using virtual machines that are executed on the NAS device, the virtual machines comprising a first virtual machine configured to perform the read operation and a second virtual machine configured to perform the array operation, wherein said performing produces a result; and
storing the result in a second file in a location in the file system that is accessible to the application server.

12. The NAS device of claim 11, wherein the remote procedure calls are selected from the group consisting of: array_compute, which identifies data to be read and an operation to be performed; array_from, which identifies a fully qualified file name for data to be read; and array_compute_save, which identifies data to be read, an operation to be performed, and a fully qualified file name for a computation result.

13. The NAS device of claim 11, wherein the method further comprises the NAS device sending, to the application server, information comprising a fully qualified name for the second file.

14. The NAS device of claim 11, wherein the remote procedure calls include information comprising a fully qualified name for the second file.

15. The NAS device of claim 11, wherein the method further comprises the NAS device sending information to the application server indicating the computation is completed.

16. A non-transitory computer-readable storage medium having computer-executable instructions that, when executed, cause an application server to perform a method, the method comprising:

identifying a computation to be performed on an array of data stored by a network-attached storage (NAS) device, the computation comprising an array operation to be performed on the array of data, the computation further comprising a read operation to be performed on a first file stored by the NAS device and containing the array of data;

generating an instruction for the computation, the instruction comprising a plurality of remote procedure calls that identify operations that are included in the computation, the remote procedure calls comprising a first remote procedure call operable for causing the NAS device to perform the read operation on the first file, the remote procedure calls further comprising a second remote procedure call operable for causing the NAS device to perform the array operation on the array of data read from the first file;

sending the instruction to the NAS device; and subsequent to execution of the operations by the NAS device, accessing a result of the computation.

17. The computer-readable storage medium of claim 16, wherein the method further comprises receiving the result at the application server from the NAS device.

18. The computer-readable storage medium of claim 16, wherein the method further comprises receiving, from the NAS device, information indicating a location in a file system managed by the NAS device of a second file that contains the result.

19. The computer-readable storage medium of claim 16, wherein the remote procedure calls include information comprising a fully qualified file name for a second file that contains the result.

20. The computer-readable storage medium of claim 16, wherein the remote procedure calls are selected from the group consisting of: array_compute, which identifies data to be read and an operation to be performed; array_from, which identifies a fully qualified file name for data to be read; and array_compute_save, which identifies data to be read, an operation to be performed, and a fully qualified file name for a computation result.

* * * * *

UNITED STATES PATENT AND TRADEMARK OFFICE
CERTIFICATE OF CORRECTION

PATENT NO. : 9,509,773 B2  
APPLICATION NO. : 14/482352  
DATED : November 29, 2016  
INVENTOR(S) : Chadha et al.

Page 1 of 1

It is certified that error appears in the above-identified patent and that said Letters Patent is hereby corrected as shown below:

In the Specification

In Column 3, Line 8, delete "58B" and insert --5B--, therefor

In Column 4, Line 63, delete "660" and insert --650--, therefor

In Column 5, Line 25, delete "exokemel," and insert --exokernel,--, therefor

In the Claims

In Column 14, Line 12, in Claim 9, delete "of" and insert --of:--, therefor

In Column 14, Line 29, in Claim 11, delete "Instruction" and insert --instruction--, therefor Signed and Sealed this  
Eighth Day of May, 2018

Andrei Iancu  
*Director of the United States Patent and Trademark Office*